US012627321B2

(12) United States Patent
King et al.

(10) Patent No.: US 12,627,321 B2
(45) Date of Patent: **\*May 12, 2026**

(54) RADIO FREQUENCY FRONT END HAVING SHARED PATH WITH COMMON FILTER

(71) Applicant: Skyworks Solutions, Inc., Irvine, CA (US)

(72) Inventors: Joel Richard King, Newbury Park, CA (US); Tianming Chen, Newbury Park, CA (US); Shayan Farahvash, Kensington, CA (US); Stephane Richard Marie Wloczysiak, Irvine, CA (US); Anand Raghavan, Middleton, WI (US); David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 18/649,371

(22) Filed: Apr. 29, 2024

(65) Prior Publication Data

US 2024/0396577 A1 Nov. 28, 2024

Related U.S. Application Data

(63) Continuation of application No. 17/457,385, filed on Dec. 2, 2021, now Pat. No. 11,973,523.

(Continued)

(51) Int. Cl.
*H04B 1/04* (2006.01)
*H04B 1/12* (2006.01)

(52) U.S. Cl.
CPC ............... *H04B 1/04* (2013.01); *H04B 1/126* (2013.01); *H04B 2001/0408* (2013.01)

(58) Field of Classification Search
CPC ......... H03F 2200/451; H03F 2200/294; H03F 3/195; H03F 3/245; H03F 3/19;
(Continued)

(56) References Cited

U.S. PATENT DOCUMENTS 6,359,514 B1 3/2002 King et al.
6,472,935 B2 10/2002 King et al.
(Continued)

FOREIGN PATENT DOCUMENTS

EP 2555437 2/2013
JP H10-107677 4/1998
(Continued)

*Primary Examiner* — Golam Sorowar
(74) *Attorney, Agent, or Firm* — VIA LLP

(57) ABSTRACT

Radio frequency front end modules are provided. In one aspect, a front end system includes at least one power amplifier configured to amplify a transmit radio frequency signal, at least one low noise amplifier configured to receive a receive radio frequency signal, an output node coupled to an antenna. The front end system further includes at least one switch configured to selectively couple the output node to the at least one power amplifier during a transmit period and to the at least one low noise amplifier during a receive period, at least one transmit filter coupled between the power amplifier and the at least one switch, and at least one receive filter coupled between the low noise amplifier and the at least one switch.

20 Claims, 18 Drawing Sheets

Related U.S. Application Data

(60) Provisional application No. 63/122,226, filed on Dec. 7, 2020, provisional application No. 63/122,145, filed on Dec. 7, 2020.

(58) Field of Classification Search
CPC ........ H03F 2200/111; H03F 3/68; H03F 3/72; H03F 1/56; H03F 1/565; H03F 2200/504; H03F 3/193; H03F 3/211; H03F 1/223; H03F 3/213; H03F 1/0216; H03F 1/0277; H03F 1/26; H03F 2200/102; H03F 1/0205; H03F 2200/222; H03F 3/45475; H04B 1/0057; H04B 7/15535; H04B 1/48; H04B 1/525; H04B 1/04; H04B 1/0067; H04B 1/18; H04B 1/44; H04B 7/15542; H04B 7/15557; H04B 2001/0408; H04B 7/155; H04B 1/005; H04B 1/0064; H04B 1/1036; H04B 7/0413; H04B 1/006; H04B 1/10; H04B 7/04; H04B 1/3877; H04B 1/52; H04B 1/0458; H04L 5/14; H04L 5/001; H04L 5/1469; H04L 5/143; H04L 43/16; H04L 43/028; H04L 1/0041; H04L 1/0045; H04L 1/0057; H04L 1/0071; H04L 27/2647; H04L 5/003; H04L 5/0091; H04L 5/1461; H04L 5/1438; H04L 5/16; H04L 25/0272; H04L 25/0292; H04L 25/0298; H04L 27/18; H04L 27/20; H04L 27/2623; H04L 5/0023; H04W 72/0453; H04W 88/04; H04W 52/52; H04W 88/06; H04W 16/26; H04W 88/08; H04W 52/0229; H04W 40/22; H04W 24/08; H04W 52/16; H04W 52/243; H04W 52/46; H04W 16/14; H04W 36/06; H04W 36/30; H04W 4/70; H04W 52/02; H04W 52/0209; H04W 52/0216; H04W 52/08; H04W 52/34; H04W 64/003

See application file for complete search history.

(56) References Cited

U.S. PATENT DOCUMENTS

| | | | |
|---|---|---|---|
| 7,493,152 B1 * | 2/2009 | Fifield | H04B 7/061 |
| | | | 455/552.1 |
| 9,344,140 B2 | 5/2016 | Reisner et al. | |
| 9,571,037 B2 | 2/2017 | Wloczysiak | |
| 9,572,052 B2 | 2/2017 | King et al. | |
| 9,621,327 B2 | 4/2017 | Chang et al. | |
| 9,866,268 B2 | 1/2018 | King et al. | |
| 9,866,366 B2 | 1/2018 | Pehlke | |
| 9,893,794 B2 | 2/2018 | Wloczysiak | |
| 10,103,772 B2 | 10/2018 | Pehlke et al. | |
| 10,135,408 B2 | 11/2018 | Cao et al. | |
| 10,153,736 B2 | 12/2018 | King et al. | |
| 10,211,857 B2 | 2/2019 | King et al. | |
| 10,340,961 B2 | 7/2019 | King et al. | |
| 10,374,578 B2 | 8/2019 | Domino et al. | |
| 10,560,139 B2 | 2/2020 | Brunel et al. | |
| 10,581,466 B2 | 3/2020 | Pehlke | |
| 10,630,320 B2 | 4/2020 | King | |
| 10,637,555 B2 | 4/2020 | Wloczysiak | |
| 10,840,957 B2 | 11/2020 | Raghavan | |
| 10,840,958 B2 | 11/2020 | Raghavan | |
| 10,855,325 B2 | 12/2020 | Raghavan | |
| 10,862,661 B2 | 12/2020 | Brunel et al. | |
| 10,965,021 B2 | 3/2021 | Wloczysiak | |
| 10,985,784 B2 | 4/2021 | King | |
| 11,018,727 B2 | 5/2021 | Wloczysiak | |
| 11,038,471 B2 | 6/2021 | Drogi et al. | |
| 11,082,077 B2 | 8/2021 | Wloczysiak | |
| 11,095,575 B2 | 8/2021 | Wloczysiak et al. | |
| 11,128,323 B2 | 9/2021 | Pehlke et al. | |
| 11,223,324 B2 | 1/2022 | Balteanu et al. | |
| 11,245,432 B2 | 2/2022 | Farahvash et al. | |
| 11,374,538 B2 | 6/2022 | Drogi et al. | |
| 11,398,846 B2 * | 7/2022 | Yoo | H03F 3/245 |
| 11,469,798 B2 | 10/2022 | Pehlke | |
| 11,476,815 B2 | 10/2022 | Drogi et al. | |
| 11,558,079 B2 | 1/2023 | Raghavan et al. | |
| 11,973,523 B2 | 4/2024 | King et al. | |
| 12,057,866 B2 | 8/2024 | King et al. | |
| 2002/0090974 A1 | 7/2002 | Hagn | |
| 2004/0266378 A1 | 12/2004 | Fukamachi et al. | |
| 2007/0066245 A1 | 3/2007 | Snider | |
| 2009/0207764 A1 | 8/2009 | Fukamachi et al. | |
| 2011/0304012 A1 | 12/2011 | Kim et al. | |
| 2012/0044919 A1 * | 2/2012 | Medapalli | H04B 1/406 |
| | | | 370/338 |
| 2015/0118977 A1 | 4/2015 | Emmanuel | |
| 2016/0127016 A1 | 5/2016 | Pehlke et al. | |
| 2016/0261901 A1 * | 9/2016 | Petrovic | H04N 21/6168 |
| 2017/0063404 A1 | 3/2017 | Langer et al. | |
| 2017/0126270 A1 * | 5/2017 | Su | H04B 1/56 |
| 2018/0337643 A1 | 11/2018 | Yoshimi | |
| 2019/0260399 A1 | 8/2019 | Wloczysiak | |
| 2019/0273523 A1 | 9/2019 | Wloczysiak et al. | |
| 2020/0028489 A1 | 1/2020 | Ta et al. | |
| 2020/0028492 A1 | 1/2020 | Ta et al. | |
| 2020/0067559 A1 | 2/2020 | Wich et al. | |
| 2020/0067606 A1 | 2/2020 | Raghavan | |
| 2021/0091832 A1 | 3/2021 | Obiya et al. | |
| 2021/0098897 A1 | 4/2021 | Pehlke et al. | |
| 2021/0099137 A1 * | 4/2021 | Drogi | H03F 1/0227 |
| 2021/0099199 A1 | 4/2021 | Pehlke et al. | |
| 2021/0218370 A1 | 7/2021 | Balteanu et al. | |
| 2021/0384875 A1 | 12/2021 | Lyalin et al. | |
| 2021/0408992 A1 | 12/2021 | Chen et al. | |
| 2022/0069775 A1 | 3/2022 | Balteanu et al. | |
| 2022/0069786 A1 | 3/2022 | Jia et al. | |
| 2022/0069787 A1 | 3/2022 | King et al. | |
| 2022/0069788 A1 | 3/2022 | King et al. | |
| 2022/0069846 A1 | 3/2022 | Loh et al. | |
| 2022/0069850 A1 | 3/2022 | Loh et al. | |
| 2022/0182085 A1 | 6/2022 | King et al. | |
| 2022/0239430 A1 | 7/2022 | Jayaraman et al. | |
| 2022/0255567 A1 | 8/2022 | Guo et al. | |
| 2022/0393654 A1 | 12/2022 | Li et al. | |
| 2023/0017220 A1 | 1/2023 | Lyalin et al. | |

FOREIGN PATENT DOCUMENTS

| | | |
|---|---|---|
| JP | 2003-087150 | 3/2003 |
| JP | 2006-304081 | 11/2006 |
| JP | 2007-251508 | 9/2007 |
| JP | 2019-140671 | 8/2019 |
| KR | 10-0629575 | 9/2006 |

* cited by examiner

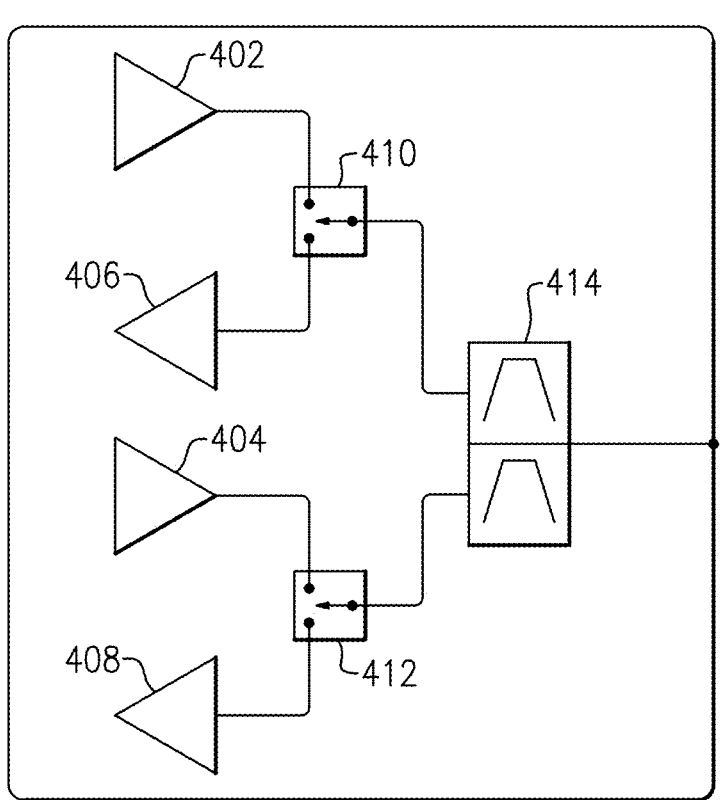
<u>FIG.7A</u>

RADIO FREQUENCY FRONT END HAVING SHARED PATH WITH COMMON FILTER

CROSS-REFERENCE TO RELATED APPLICATION(S)

Any and all applications for which a foreign or domestic priority claim is identified in the Application Data Sheet as filed with the present application are hereby incorporated by reference under 37 CFR 1.57.

BACKGROUND

Technological Field

Aspects of this disclosure relate to radio frequency (RF) communication systems, and in particular, front end modules for use in RF communication systems.

Description of the Related Technology

RF communication systems include a front end which couples one or more antennas to transmit and receive paths that communicate the RF signals to/from a baseband system. During time-division duplexing (TDD) communication, the antennas may be connected to only one of the transmit and receive paths at a time. The front end further includes one or more filters configured to filter out frequencies from the RF signals that are not within a given communication band. Typically, the filters may be shared between the transmit and receive paths.

SUMMARY OF CERTAIN INVENTIVE ASPECTS

The systems, methods and devices of this disclosure each have several innovative aspects, no single one of which is solely responsible for the desirable attributes disclosed herein.

In one aspect, there is provided a radio frequency front end system comprising: at least one power amplifier configured to amplify a transmit radio frequency signal; at least one low noise amplifier configured to receive a receive radio frequency signal; an output node coupled to an antenna; at least one switch configured to selectively couple the output node to the at least one power amplifier during a transmit period and to the at least one low noise amplifier during a receive period; at least one transmit filter coupled between the power amplifier and the at least one switch; at least one receive filter coupled between the low noise amplifier and the at least one switch; and a common filter coupled between the at least one switch and the output node.

The at least one power amplifier can include a plurality of power amplifiers, and the at least one low noise amplifier can include a plurality of low noise amplifiers.

The front end system can further comprise a first multiplexer including the at least one transmit filter and a second multiplexer including the at least one receive filter, wherein the at least one transmit filter includes a plurality of transmit filters and the at least one receive filter includes a plurality of receive filters.

The at least one switch can be further configured to selectively couple one of the first and second multiplexers to the output node.

The front end system can further comprise a first filter bank including the at least one transmit filter and a second filter bank including the at least one receive filter, wherein the at least one transmit filter includes a plurality of transmit filters and the at least one receive filter includes a plurality of receive filters.

The at least one switch can be further configured to selectively couple one of the transit filters and one of the receiver filters to the output node simultaneously.

The at least one power amplifier can include first and second power amplifiers, and the at least one low noise amplifier can include first and second low noise amplifiers, the at least one transmit filter can include a transmit diplexer, the at least one receive filter can include a receive diplexer, and the at least one switch includes a first switch and a second switch.

The front end system can further comprise a transmit supplemental filter and a receive supplemental filter, the at least one switch can include a first switch and a second switch that are ganged together, and the second switch can be configured to selectively couple the transmit supplemental filter to the at least one power amplifier during the transmit period and to couple the receive supplemental filter the at least one low noise amplifier during the receive period.

The transmit and receive supplemental filters can include shunt filters.

The transmit and receive supplemental filters can include notch filters.

In another aspect, there is provided a mobile device comprising: an antenna configured to transmit radio frequency signals to a base station; and a front end system coupled to the antenna and configured to transmit and receive the radio frequency signals from the antenna, the front end system including a at least one power amplifier configured to amplify a transmit radio frequency signal, at least one low noise amplifier configured to receive a receive radio frequency signal, at least one switch configured to selectively couple the antenna to the at least one power amplifier during a transmit period and to the at least one low noise amplifier during a receive period, at least one transmit filter coupled between the power amplifier and the at least one switch, at least one receive filter coupled between the low noise amplifier and the at least one switch, and a common filter coupled between the at least one switch and the output node.

The at least one power amplifier can include a plurality of power amplifiers, and the at least one low noise amplifier includes a plurality of low noise amplifiers.

The front end system further can include a first multiplexer including the at least one transmit filter and a second multiplexer including the at least one receive filter, the at least one transmit filter can include a plurality of transmit filters and the at least one receive filter includes a plurality of receive filters.

The at least one switch can be further configured to selectively couple one of the first and second multiplexers to the output node.

The front end system can further include a first filter bank including the at least one transmit filter and a second filter bank including the at least one receive filter, the at least one transmit filter can include a plurality of transmit filters and the at least one receive filter includes a plurality of receive filters.

The at least one switch can be further configured to selectively couple one of the transit filters and one of the receiver filters to the output node simultaneously.

The at least one power amplifier can include first and second power amplifiers, and the at least one low noise amplifier can include first and second low noise amplifiers, the at least one transmit filter can include a transmit diplexer, the at least one receive filter can include a receive diplexer, and the at least one switch can include a first switch and a second switch.

In yet another aspect, there is provided a method of operating a radio frequency front end system, the method comprising: coupling, via at least one switch, at least one power amplifier to an antenna during a transmit period, the switch coupled to the at least one power amplifier via at least one transmit filter, and the switch coupled to an output node via a common filter; and coupling, via the at least one switch, at least one low noise amplifier to the antenna during a receive period, the switch coupled to the at least one low noise amplifier via at least one receive filter.

The common filter can be further coupled to the antenna via the output node.

The at least one power amplifier can include a plurality of power amplifiers, and the at least one low noise amplifier can include a plurality of low noise amplifiers.

BRIEF DESCRIPTION OF THE DRAWINGS

FIG. 7A illustrates an example portion of an RF front end for two bands in accordance with aspects of this disclosure.

DETAILED DESCRIPTION OF CERTAIN INVENTIVE EMBODIMENTS

Figure 1A:
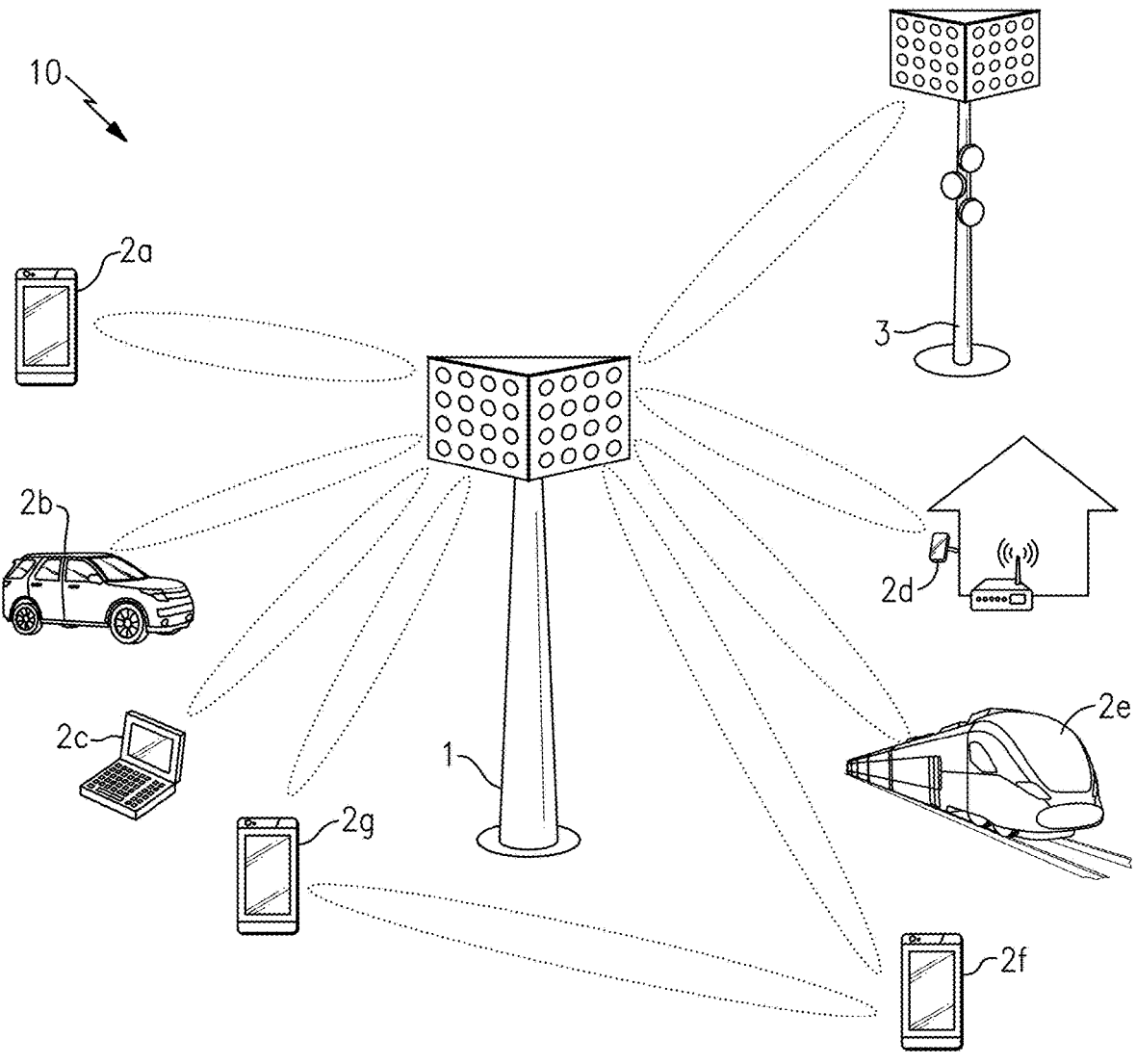
FIG. 1A is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IoT), Vehicle-to-Everything (V2X), and High Power User Equipment (HPUE).

3GPP introduced Phase 1 of fifth generation (5G) technology in Release 15, and plans to introduce Phase 2 of 5G technology in Release 16 (targeted for 2020). Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1A is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1A, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1A supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1A. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1A, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1A can be used to support a wide variety of advanced communication features, including, but not limited to, eMBB, uRLLC, and/or mMTC.

Figure 1B:
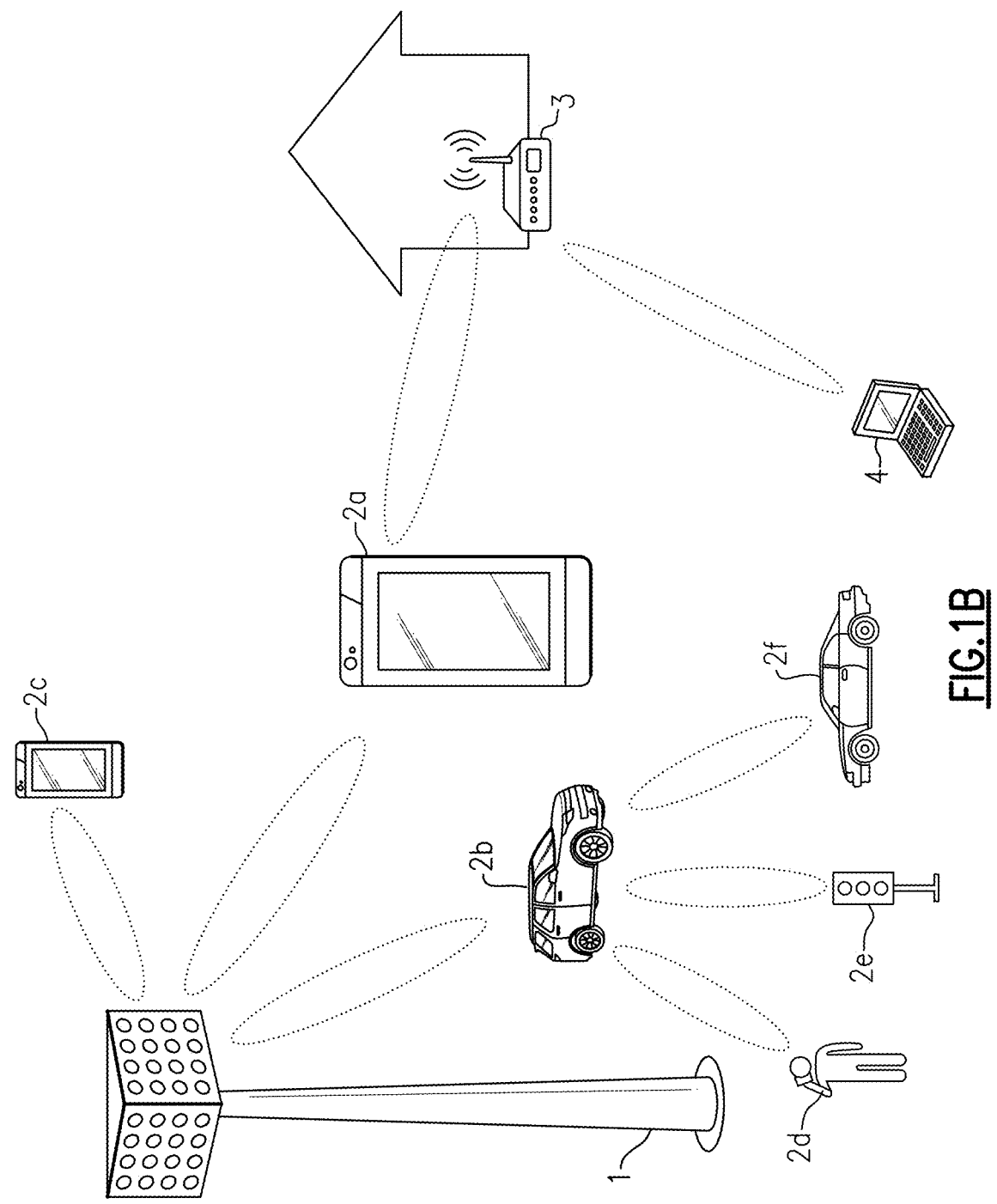
FIG. 1B is a schematic diagram of one example of a mobile device communicating via cellular and WiFi networks.

FIG. 1B is a schematic diagram of one example of a mobile device 2a communicating via cellular and WiFi networks. For example, as shown in FIG. 1B, the mobile device 2a communicates with a base station 1 of a cellular network and with a WiFi access point 3 of a WiFi network. FIG. 1B also depicts examples of other user equipment (UE) communicating with the base station 1, for instance, a wireless-connected car 2b and another mobile device 2c. Furthermore, FIG. 1B also depicts examples of other WiFi-enabled devices communicating with the WiFi access point 3, for instance, a laptop 4.

Although specific examples of cellular UE and WiFi-enabled devices is shown, a wide variety of types of devices can communicate using cellular and/or WiFi networks. Examples of such devices, include, but are not limited to, mobile phones, tablets, laptops, Internet of Things (IoT) devices, wearable electronics, customer premises equipment (CPE), wireless-connected vehicles, wireless relays, and/or a wide variety of other communication devices.

In certain implementations, UE, such as the mobile device 2a of FIG. 1B, is implemented to support communications using a number of technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

Furthermore, certain UE can communicate not only with base stations and access points, but also with other UE. For example, the wireless-connected car 2b can communicate with a wireless-connected pedestrian 2d, a wireless-connected stop light 2e, and/or another wireless-connected car 2f using vehicle-to-vehicle (V2V) and/or vehicle-to-everything (V2X) communications.

Although various examples of communication technologies have been described, mobile devices can be implemented to support a wide range of communications.

Various communication links have been depicted in FIG. 1B. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

Different users of the illustrated communication networks can share available network resources, such as available frequency spectrum, in a wide variety of ways. In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDM is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Certain RF communication systems include multiple transceivers for communicating using different wireless networks, over multiple frequency bands, and/or using different communication standards. Although implementing an RF communication system in this manner can expand functionality, increase bandwidth, and/or enhance flexibility, a number of coexistence issues can arise between the transceivers operating within the RF communication system.

For example, an RF communication system can include a cellular transceiver for processing RF signals communicated over a cellular network and a wireless local area network (WLAN) transceiver for processing RF signals communicated over a WLAN network, such as a WiFi network. For instance, the mobile device 2a of FIG. 1B is operable to communicate using cellular and WiFi networks.

Although implementing the RF communication system in this manner can provide a number of benefits, a mutual desensitization effect can arise from cellular transmissions interfering with reception of WiFi signals and/or from WiFi transmissions interfering with reception of cellular signals.

In one example, cellular Band 7 can give rise to mutual desensitization with respect to 2.4 Gigahertz (GHz) WiFi. For instance, Band 7 has an FDD duplex and operates over a frequency range of about 2.62 GHz to 2.69 GHz for downlink and over a frequency range of about 2.50 GHz to about 2.57 GHz for uplink, while 2.4 GHz WiFi has TDD duplex and operates over a frequency range of about 2.40 GHz to about 2.50 GHz. Thus, cellular Band 7 and 2.4 GHz WiFi are adjacent in frequency, and RF signal leakage due to the high power transmitter of one transceiver/front end affects receiver performance of the other transceiver/front end, particularly at border frequency channels.

In another example, cellular Band 40 and 2.4 GHz WiFi can give rise to mutual desensitization. For example, Band 40 has a TDD duplex and operates over a frequency range of about 2.30 GHz to about 2.40 GHz, while 2.4 GHz WiFi has TDD duplex and operates over a frequency range of about 2.40 GHz to about 2.50 GHz. Accordingly, cellular Band 40 and 2.4 GHz WiFi are adjacent in frequency and give rise to a number of coexistence issues, particularly at border frequency channels.

Desensitization can arise not only from direct leakage of an aggressor transmit signal to a victim receiver, but also from spectral regrowth components generated in the transmitter. Such interference can lie relatively closely in frequency with the victim receive signal and/or directly overlap it.

Figure 2:
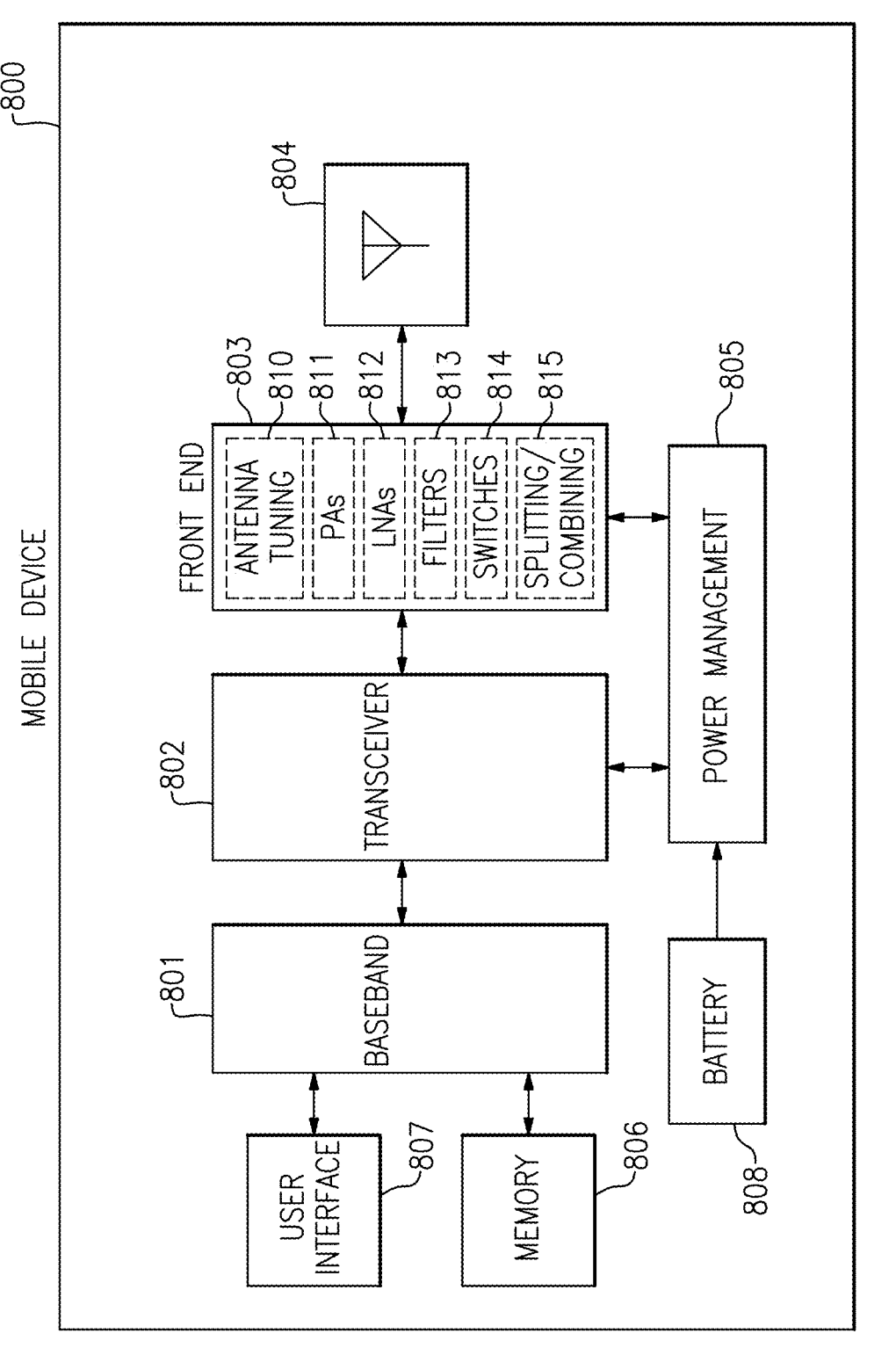
FIG. 2 is a schematic diagram of one embodiment of a mobile device.

FIG. 2 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 2 as the transceiver 802. In one example, separate components (for instance, separate circuits or dies) can be provided for handling certain types of RF signals.

The front end system 803 aids in conditioning signals transmitted to and/or received from the antennas 804. In the illustrated embodiment, the front end system 803 includes antenna tuning circuitry 810, power amplifiers (PAS) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 2, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 2, the power management system 805 receives a battery voltage from the battery 808. The battery 808 can be any suitable battery for use in the mobile device 800, including, for example, a lithium-ion battery.

Figure 3:
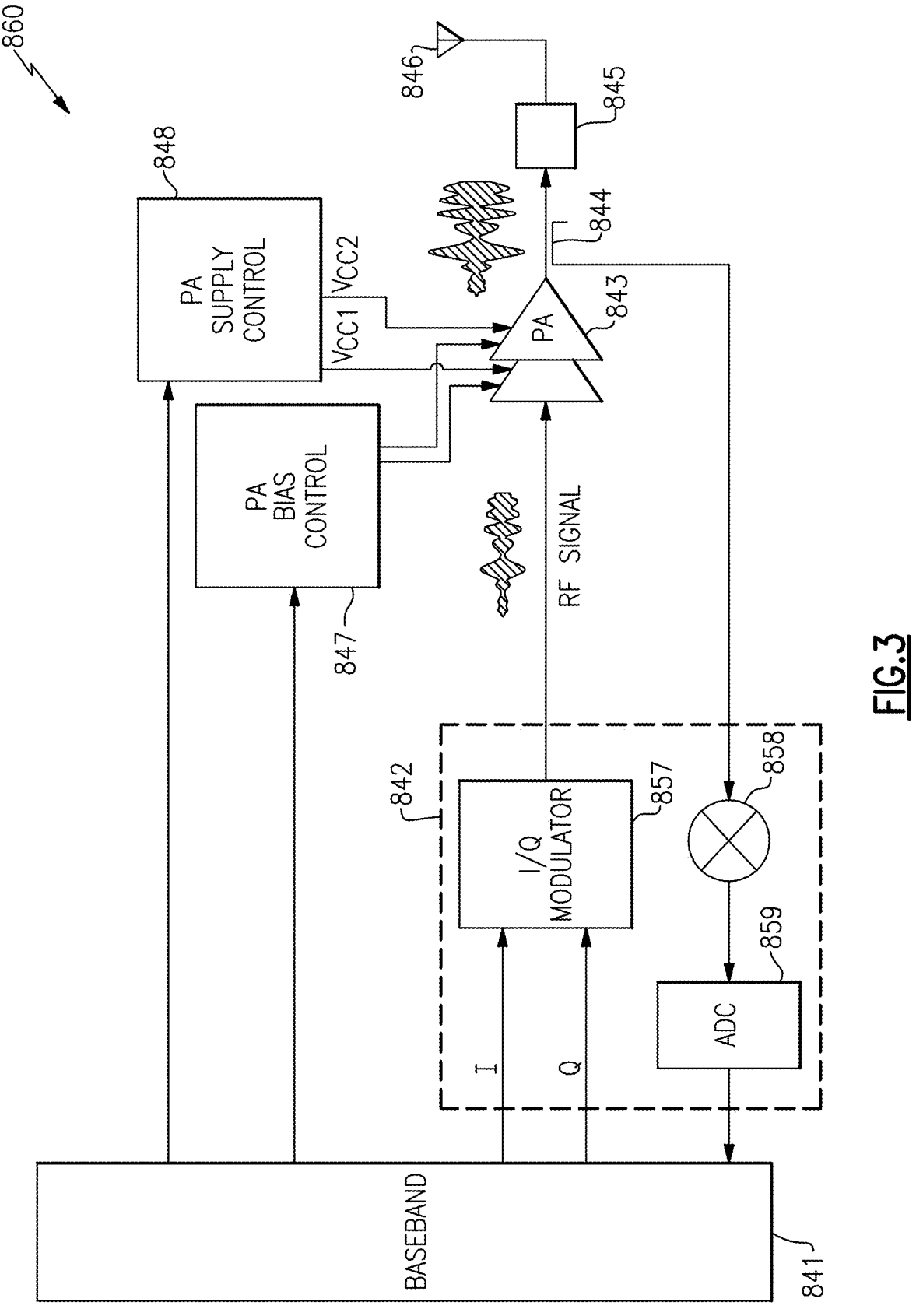
FIG. 3 is a schematic diagram of a power amplifier system according to one embodiment.

FIG. 3 is a schematic diagram of a power amplifier system 860 according to one embodiment. The illustrated power amplifier system 860 includes a baseband processor 841, a transmitter/observation receiver 842, a power amplifier (PA) 843, a directional coupler 844, front-end circuitry 845, an antenna 846, a PA bias control circuit 847, and a PA supply control circuit 848. The illustrated transmitter/observation receiver 842 includes an I/Q modulator 857, a mixer 858, and an analog-to-digital converter (ADC) 859. In certain implementations, the transmitter/observation receiver 842 is incorporated into a transceiver.

The baseband processor 841 can be used to generate an in-phase (I) signal and a quadrature-phase (Q) signal, which can be used to represent a sinusoidal wave or signal of a desired amplitude, frequency, and phase. For example, the ₁ signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals can be provided to the I/Q modulator 857 in a digital format. The baseband processor 841 can be any suitable processor configured to process a baseband signal. For instance, the baseband processor 841 can include a digital signal processor, a microprocessor, a programmable core, or any combination thereof. Moreover, in some implementations, two or more baseband processors 841 can be included in the power amplifier system 860.

The I/Q modulator 857 can be configured to receive the I and Q signals from the baseband processor 841 and to process the I and Q signals to generate an RF signal. For example, the I/Q modulator 857 can include digital-to-analog converters (DACs) configured to convert the I and Q signals into an analog format, mixers for upconverting the I and Q signals to RF, and a signal combiner for combining the upconverted I and Q signals into an RF signal suitable for amplification by the power amplifier 843. In certain implementations, the I/Q modulator 857 can include one or more filters configured to filter frequency content of signals processed therein.

The power amplifier 843 can receive the RF signal from the I/Q modulator 857, and when enabled can provide an amplified RF signal to the antenna 846 via the front-end circuitry 845.

The front-end circuitry 845 can be implemented in a wide variety of ways. In one example, the front-end circuitry 845 includes one or more switches, filters, diplexers, multiplexers, and/or other components. In another example, the front-end circuitry 845 is omitted in favor of the power amplifier 843 providing the amplified RF signal directly to the antenna 846.

The directional coupler 844 senses an output signal of the power amplifier 823. Additionally, the sensed output signal from the directional coupler 844 is provided to the mixer 858, which multiplies the sensed output signal by a reference signal of a controlled frequency. The mixer 858 operates to generate a downshifted signal by downshifting the sensed output signal's frequency content. The downshifted signal can be provided to the ADC 859, which can convert the downshifted signal to a digital format suitable for processing by the baseband processor 841. Including a feedback path from the output of the power amplifier 843 to the baseband processor 841 can provide a number of advantages. For example, implementing the baseband processor 841 in this manner can aid in providing power control, compensating for transmitter impairments, and/or in performing digital pre-distortion (DPD). Although one example of a sensing path for a power amplifier is shown, other implementations are possible.

The PA supply control circuit 848 receives a power control signal from the baseband processor 841, and controls supply voltages of the power amplifier 843. In the illustrated configuration, the PA supply control circuit 848 generates a first supply voltage $V_{CC1}$ for powering an input stage of the power amplifier 843 and a second supply voltage $V_{CC2}$ for powering an output stage of the power amplifier 843. The PA supply control circuit 848 can control the voltage level of the first supply voltage $V_{CC1}$ and/or the second supply voltage $V_{CC2}$ to enhance the power amplifier system's PAE.

The PA supply control circuit 848 can employ various power management techniques to change the voltage level of one or more of the supply voltages over time to improve the power amplifier's power added efficiency (PAE), thereby reducing power dissipation.

One technique for improving efficiency of a power amplifier is average power tracking (APT), in which a DC-to-DC converter is used to generate a supply voltage for a power amplifier based on the power amplifier's average output power. Another technique for improving efficiency of a power amplifier is envelope tracking (ET), in which a supply voltage of the power amplifier is controlled in relation to the envelope of the RF signal. Thus, when a voltage level of the envelope of the RF signal increases the voltage level of the power amplifier's supply voltage can be increased. Likewise, when the voltage level of the envelope of the RF signal decreases the voltage level of the power amplifier's supply voltage can be decreased to reduce power consumption.

In certain configurations, the PA supply control circuit 848 is a multi-mode supply control circuit that can operate in multiple supply control modes including an APT mode and an ET mode. For example, the power control signal from the baseband processor 841 can instruct the PA supply control circuit 848 to operate in a particular supply control mode.

As shown in FIG. 3, the PA bias control circuit 847 receives a bias control signal from the baseband processor 841, and generates bias control signals for the power amplifier 843. In the illustrated configuration, the bias control circuit 847 generates bias control signals for both an input stage of the power amplifier 843 and an output stage of the power amplifier 843. However, other implementations are possible.

Figure 4A:
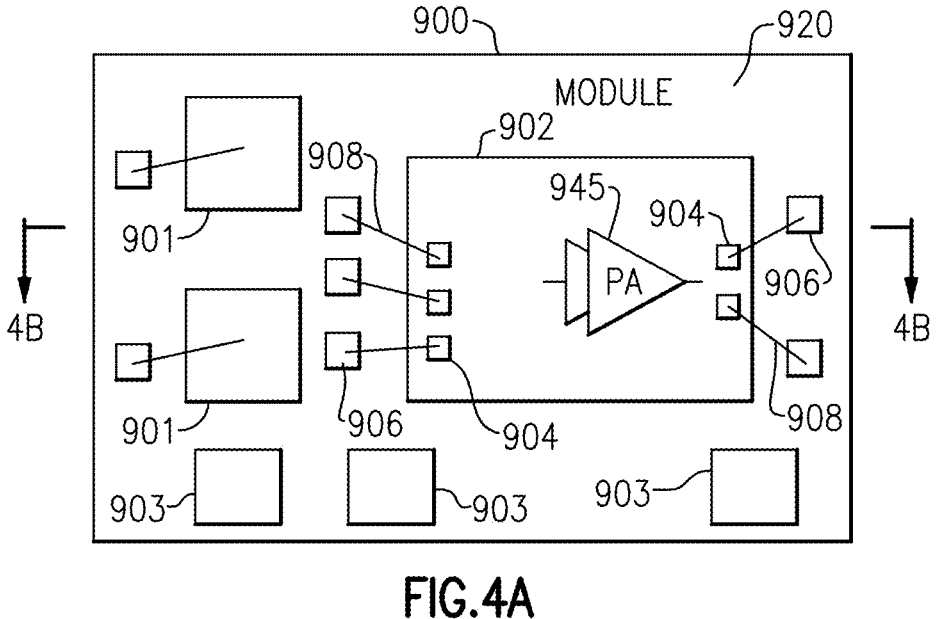
FIG. 4A is a schematic diagram of one embodiment of a packaged module.
Figure 4B:
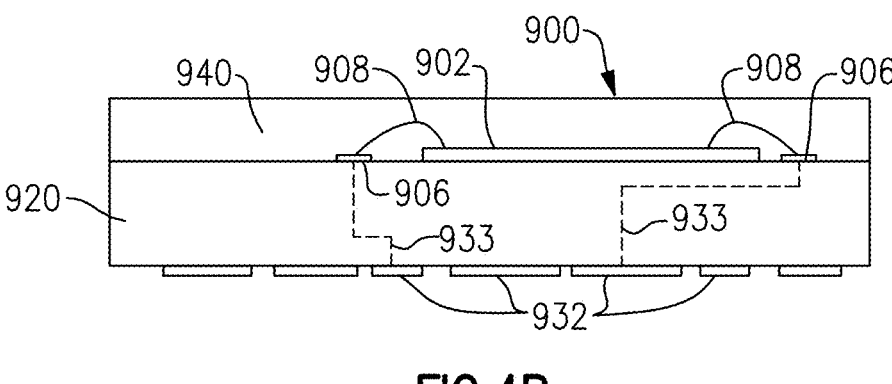
FIG. 4B is a schematic diagram of a cross-section of the packaged module of FIG. 4A taken along the lines 4B-4B.

FIG. 4A is a schematic diagram of one embodiment of a packaged module 900. FIG. 4B is a schematic diagram of a cross-section of the packaged module 900 of FIG. 4A taken along the lines 4B-4B.

The packaged module 900 includes radio frequency components 901, a semiconductor die 902, surface mount devices 903, wirebonds 908, a package substrate 920, and an encapsulation structure 940. The package substrate 920 includes pads 906 formed from conductors disposed therein. Additionally, the semiconductor die 902 includes pins or pads 904, and the wirebonds 908 have been used to connect the pads 904 of the die 902 to the pads 906 of the package substrate 920.

The semiconductor die 902 includes a power amplifier 945, which can be implemented in accordance with one or more features disclosed herein.

The packaging substrate 920 can be configured to receive a plurality of components such as radio frequency components 901, the semiconductor die 902 and the surface mount devices 903, which can include, for example, surface mount capacitors and/or inductors. In one implementation, the radio frequency components 901 include integrated passive devices (IPDs).

As shown in FIG. 4B, the packaged module 900 is shown to include a plurality of contact pads 932 disposed on the side of the packaged module 900 opposite the side used to mount the semiconductor die 902. Configuring the packaged module 900 in this manner can aid in connecting the packaged module 900 to a circuit board, such as a phone board of a mobile device. The example contact pads 932 can be configured to provide radio frequency signals, bias signals, and/or power (for example, a power supply voltage and ground) to the semiconductor die 902 and/or other components. As shown in FIG. 4B, the electrical connections between the contact pads 932 and the semiconductor die 902 can be facilitated by connections 933 through the package substrate 920. The connections 933 can represent electrical paths formed through the package substrate 920, such as connections associated with vias and conductors of a multilayer laminated package substrate.

In some embodiments, the packaged module 900 can also include one or more packaging structures to, for example, provide protection and/or facilitate handling. Such a packaging structure can include overmold or encapsulation structure 940 formed over the packaging substrate 920 and the components and die(s) disposed thereon.

It will be understood that although the packaged module 900 is described in the context of electrical connections based on wirebonds, one or more features of the present disclosure can also be implemented in other packaging configurations, including, for example, flip-chip configurations.

Figure 5:
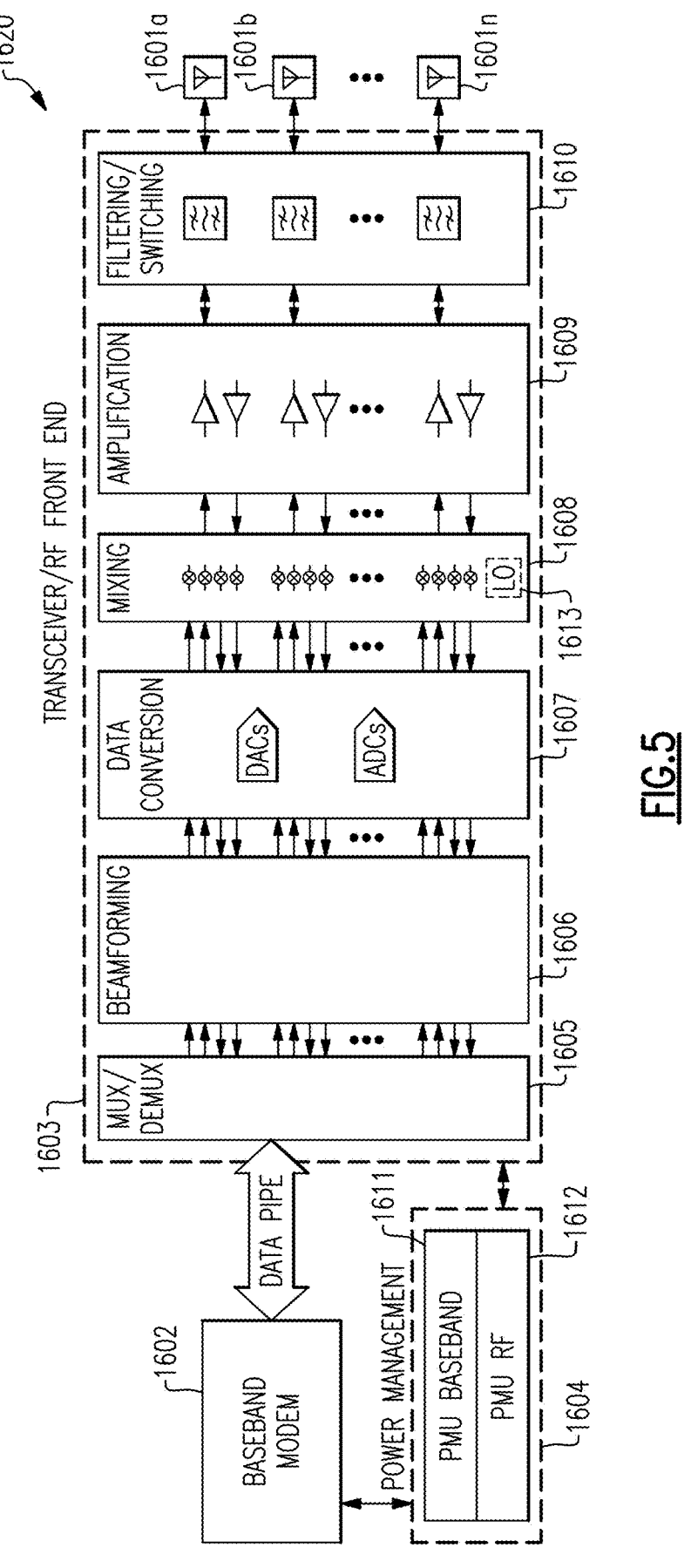
FIG. 5 is a schematic diagram of one embodiment of a transceiver/RF front end.

FIG. 5 is a schematic diagram of one embodiment of an RF communication system 1620 including a transceiver/RF front end 1603 (or simply RF front end). In detail, the RF communication system includes a baseband modem 1602, the RF front end 1603, power management 1604, and a plurality of antennas 1601a-1601n.

The RF front end 1603 is connected to the baseband modem 1602 to receive and transmit baseband signals to/from the baseband modem 1602. The baseband signals received from the baseband modem 1602 processed by the RF front end to be wirelessly transmitted via the antennas 1601a-1601n. Similarly, RF signals received via the antennas 1601a-1601n are processed by the RF front end 1603 and before being provided to the baseband modem 1602.

The power management 1604 provides power to each of the baseband modem 1602 and the RF front end 1603. To this end, the power management 1604 includes a power management unit (PMU) baseband 1611 configured to provide power to the baseband modem 1602 and a PMU RF 1612 configured to provide power to the RF front end 1603.

The RF front end 1603 includes a MUX/DEMUX block 1605, a beamforming block 1606, a data conversion block 1607, a mixing block 1608, an amplification block 1609, and a filtering/switching block 1610. The MUX/DEMUX block 1605 can be configured to control the flow of RF signals to/from the baseband modem 1602 through a plurality of communication band paths through the remainder of the RF front end 1603. The beamforming block 1606 is configured to adjust the gain and/or phase of the plurality of RF signals to direct beams to focus signal strength in a desired direction for RF signals transmitted and received from the antennas 1601a-1601n.

The data conversion block 1607 can contain a plurality of DACs configured to convert the signals received from the beamforming block 1606 into an analog format. The data conversion block 1607 can also contain a plurality of ADCs configured to convert analog signals received from the mixing block 1608 into a digital format. The mixing block 1608 can include a plurality of local oscillators (LOs) and is configured to upconvert the analog signals received from the data conversion block 1607 and downconvert the signals received from the amplification block 1609.

The amplification block 1609 can include a plurality of PAs configured to amplify signals received from the mixing block and a plurality of LNAs configured to amplify signals received from the filtering/switching block 1610. The filtering/switching block 1610 includes a plurality of filters configured to filter out frequencies that do not form a part of a correspond communication band and a plurality of switches configured to selectively connect the antennas 1601a-1601n to one or more of the communication bands.

Embodiments of RF Front End Modules

As described above, communications systems typically include an RF front end designed to connect a baseband model to one or more antennas and process the RF signals communicated therebetween.

In traditional TDD RF front ends (RFFE) for cell phones, a common filter can be used for both the transmit and receive paths to save area and cost. There may be conflicting design goals for such common filters, which include (a) a sufficiently high rejection in the receive mode for blockers relatively close to the band edge such as 3GPP range 3 blockers, and (b) a sufficiently low insertion loss in the transmit mode to have a module with high efficiency. For certain bands, it can be more difficult to achieve the above described design goals when a given band is spaced relatively close to another band. For example, within the 5G standard, band n79 is located only 125 MHz away from the high edge of the band for the first WiFi 5 GHz channel. As another example, for the 5G band n77, strong HB and WiFi 2.4 GHz blockers are located only a few hundred MHz away from the lower edge of the n77 band.

In addition, there are stringent regulatory requirement for 5G NR, which include a requirement that power amplifiers exhibit high linearity (e.g., a threshold level of linearity) to prevent unwanted emissions in adjacent public bands and military bands. To save area for compact cell phones, the n77 and n79 bands may be routed through a multiplexer to a common antenna. The n77 and n79 bands are two examples of 5G NR TDD bands where TX and RX share a common path to the antenna port of an RFFE module. Similarly, a multiplexer can be used such that the n79 band path is shared between n79 transmit and n79 receive.

Another challenging trade-off exists for band B41 when coexistence with WiFi imposes more than 50 dB rejection of transmit noise on the lower side of the B41 band without impacting the filter insertion loss during the receive period of a TDD frame.

Figure 6A:
FIG. 6A is an example multiband RF front end which can be used for TDD in accordance with aspects of this disclosure.
Figure 6A:
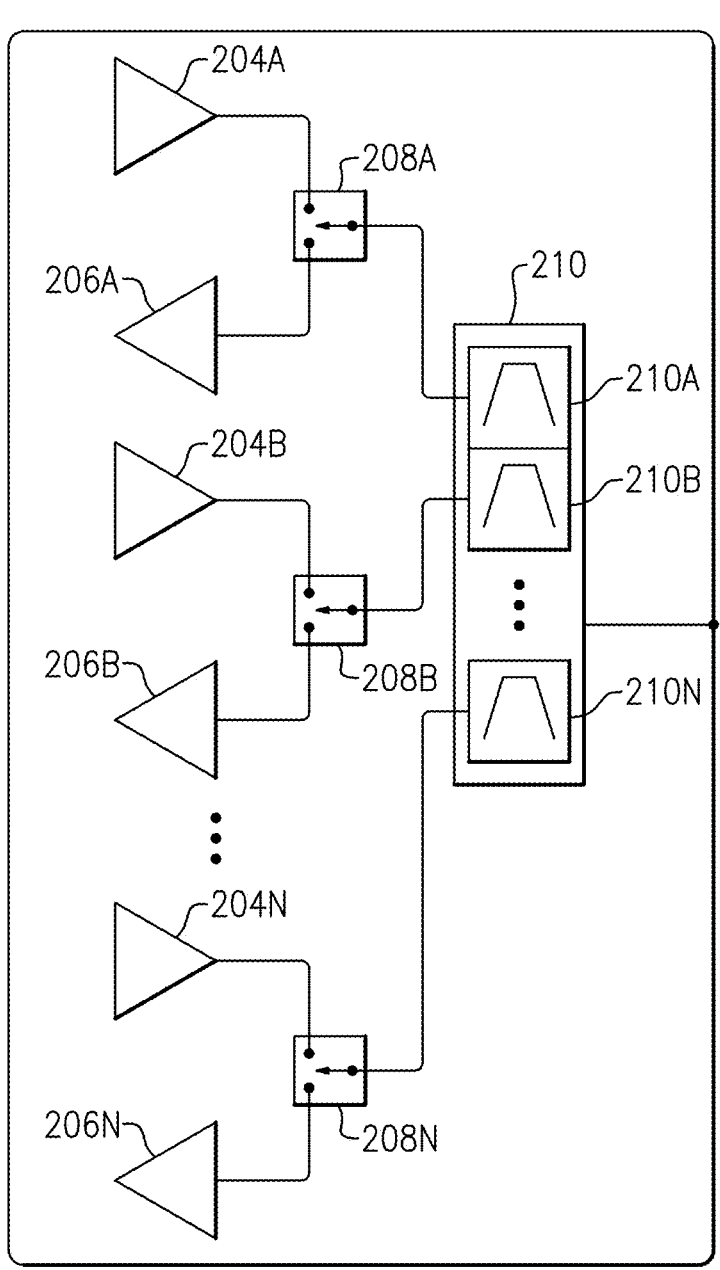

FIG. 6A is an example multiband RF front end 203 which can be used for TDD in accordance with aspects of this disclosure. The example RF front end 203 may be configured to transmit/receive N bands Band 1, Band 2, . . . , Band N. The RF front end 203 includes a plurality of power amplifiers 204A, 204B, . . . , 204N; a plurality of low noise amplifiers 206A, 206B, . . . , 206N; a plurality of transmit/receive switches 208A, 208B, . . . , 208N; and a multiplexer 210 including a plurality of filters 210A, 210B, . . . , 210N.

With reference to Band 1 as an example, each band within the RF front end 203 may have a dedicated power amplifier 204A for a transmit path and a dedicated low noise amplifier 206A in a receive path. The transmit and receive paths for Band 1 are combined via the corresponding transmit/receive switch 208A. Each of the transmit/receive switches 208A-208N are connected to the multiplexer 210 to connect the bands Band 1-Band N to the output node to be connected to one or more antennas. The filters 210A-210N may be implemented as band-pass filters configured to pass frequencies associated with the corresponding bands Band 1-Band N.

Figure 6B:
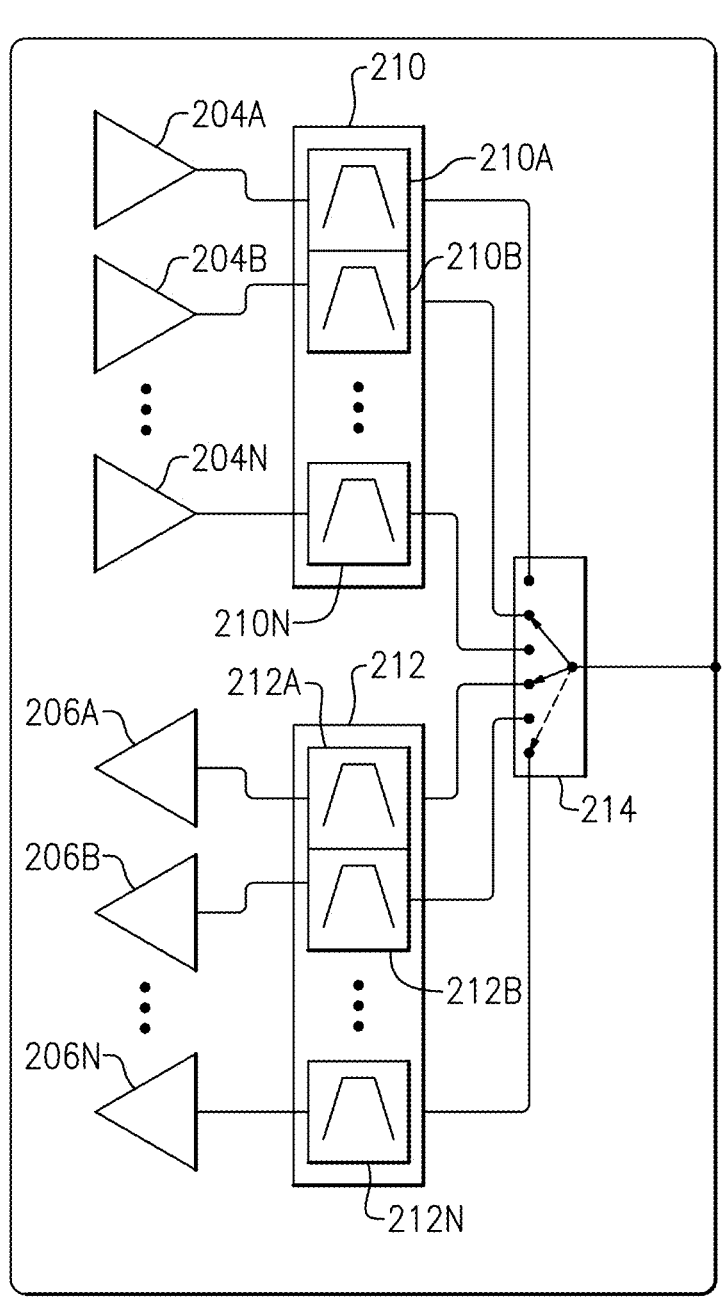
FIG. 6B is another example multiband RF front end which can be used for TDD in accordance with aspects of this disclosure.

FIG. 6B is another example multiband RF front end 203 which can be used for TDD in accordance with aspects of this disclosure. In particular, the RF front end 203 of FIG. 6B may be configured as a high performance TDD RF front end 203. Similar to the example of FIG. 6A, the example RF front end 203 may be configured to transmit/receive N bands Band 1, Band 2, . . . , Band N. The RF front end 203 includes a plurality of power amplifiers 204A, 204B, . . . , 204N; a plurality of low noise amplifiers 206A, 206B, . . . , 206N; a first filter bank 210 including a first plurality of filters 210A, 210B, . . . , 210N; a second filter bank 212 including a second plurality of filters 212A, 212B, . . . , 212N; and a single-pole N-throw transmit/receive switch 214.

In order to provide improved performance compared to FIG. 6A, there are two sets of individual filters in the embodiment of FIG. 6B, the first filters 210A-210N for transmit RF signals and the second filters 212A-212N for receive RF signals. In implementation in which the RF front end 203 supports simultaneously transmitting and receiving between constituent bands Band 1-Band N, the transmit and receive paths are connected to the transmit/receive switch 214 which can be configured to connect multiple receive paths and transmit paths concurrently to the output node to be connected to one or more antennas.

Figure 6C:
FIG. 6C is yet another example multiband RF front end which can be used for TDD in accordance with aspects of this disclosure.
Figure 6C:
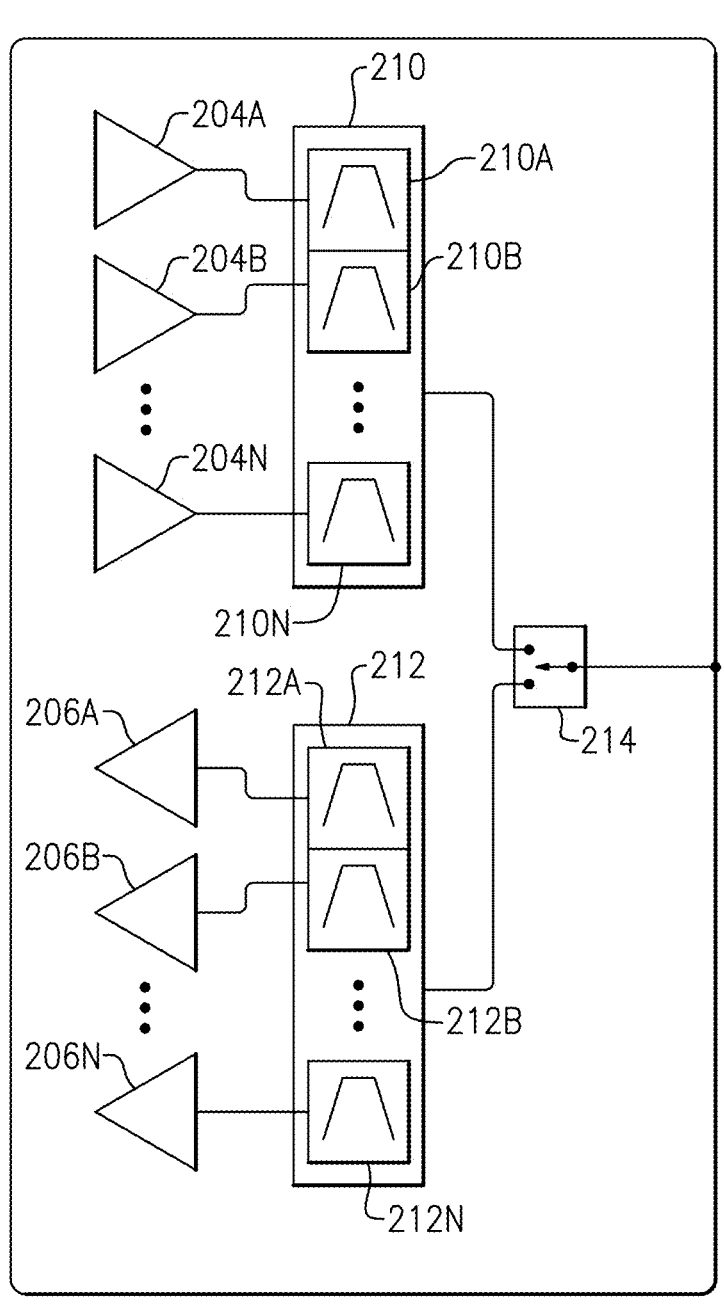

FIG. 6C is yet another example multiband RF front end 203 which can be used for TDD in accordance with aspects of this disclosure. In particular, the RF front end 203 of FIG. 6B may be configured as another example of a high performance TDD RF front end 203. Compared to FIG. 6B, the embodiment of FIG. 6C has lower insertion loss (thus higher TX efficiency) because the TDD switch has a fewer number of throws. Similar to the example of FIG. 6B, the example RF front end 203 may be configured to transmit/receive N bands Band 1, Band 2, . . . , Band N. The RF front end 203 includes a plurality of power amplifiers 204A, 204B, . . . , 204N; a plurality of low noise amplifiers 206A, 206B, . . . , 206N; a first multiplexer 210 including a first plurality of filters 210A, 210B, . . . , 210N; a second multiplexer 212 including a second plurality of filters 212A, 212B, . . . , 212N; and a single-pole double-throw transmit/receive switch 216.

In implementation in which the RF front end 203 does not support simultaneous receive and transmit between constituent bands Band 1-Band N, the transmit/receive switch 216 is connected to a common node of each of the first and second multiplexers 210 and 212 to be selectively connected to the output node.

FIG. 7A illustrates an example portion of an RF front end 310 for two bands in accordance with aspects of this disclosure. As shown in FIG. 7A, the RF front end 310 includes a first power amplifier 402, a second power amplifier 404, a first low noise amplifier 406, a second low noise amplifier 408, a first transmit/receive switch 410, a second transmit/receive switch 412, and a diplexer 414.

The first power amplifier 402, the first low noise amplifier 406, and the first switch 410 may be configured to transmit and receive RF signals for a first band using TDD while the second power amplifier 404, the second low noise amplifier 408, and the second switch 412 may be configured to transmit and receive RF signals for a second band using TDD. The first and second transmit/receive switches 410 and 412 can be configured such that each of the first and second bands is in either a transmit or a receive mode. The diplexer 414 may be formed of a pair of band-pass filters, which respectively pass RF signals corresponding to the first and second bands between the output node and the respective first and second transmit/receive switches 410 and 412.

For certain bands (e.g., bands n77 and n79), aspects of this disclosure relate to addressing at least some of the above-described challenges related to closely spaced band. For example, aspects of this disclosure relate to addressing the conflicting design goals of (a) a sufficiently high rejection in the receive mode for blockers relatively close to the band edge such as 3GPP range 3 blockers, and (b) a sufficiently low insertion loss in the transmit mode to have a module with high efficiency. Since in the embodiment of FIG. 7A, a common filter is used for both RX and TX, the conflicting design goals may result in compromise in either rejection or insertion loss.

Figure 7B:
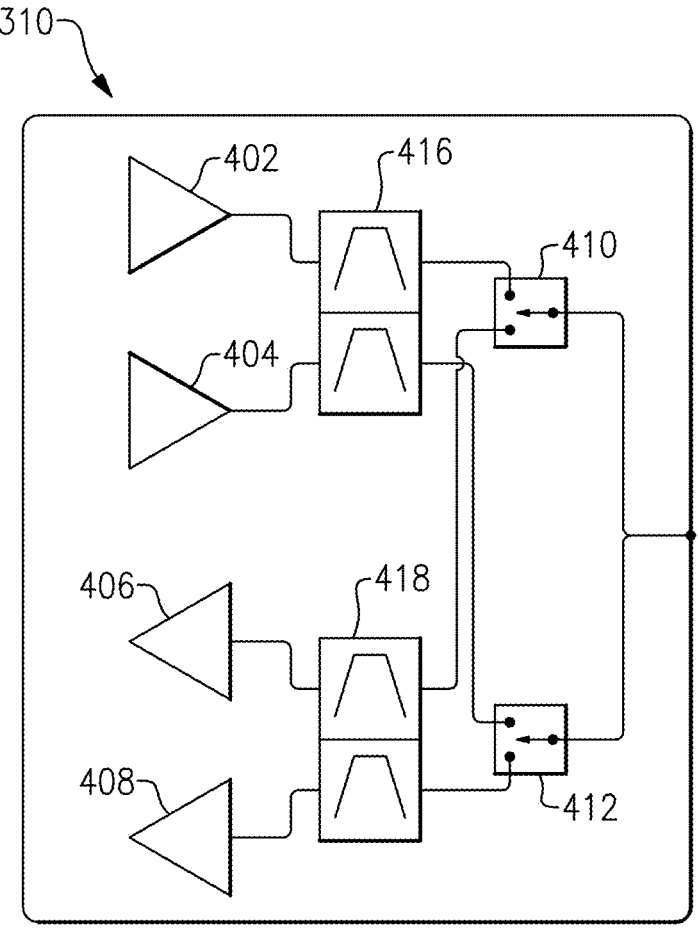
FIG. 7B illustrates another example portion of an RF front end for two bands in accordance with aspects of this disclosure.

FIG. 7B illustrates another example portion of an RF front end 310 for two bands in accordance with aspects of this disclosure. In this implementation, the RF front end 310 includes a first power amplifier 402, a second power amplifier 404, a first low noise amplifier 406, a second low noise amplifier 408, a first transmit/receive switch 410, a second transmit/receive switch 412, a first diplexer 416, and a second diplexer 418.

In the FIG. 7B example, rather than using a common diplexer (e.g., such as the diplexer 414 of FIG. 7A) for both receive and transmit modes of TDD, the FIG. 7B embodiment includes separate first and second diplexers 416 and 418, which can be configured to address different set of specifications and/or design constraints for the receive and transmit paths.

For example, the second diplexer 418 on the receive side is configured to filter signals received from the output node before providing the filtered signals to the low noise amplifiers 406 and 408. The second filter 418 can be configured to reject RF signals at close-in frequencies (from the band edge) in order to reject blockers that can produce unwanted in-band intermodulation distortion (IMD) components. Due to the additional rejection properties of the receive filters forming the diplexer 218, the insertion loss of the diplexer may be comparatively higher than a diplexer without these rejections.

The first diplexer 416 on the transmit side may have relatively permissive rejection specifications and/or design constraints compared to receive path. Thus, the first diplexer 416 on the transmit side can be configured with significantly lower insertion loss compared to second diplexer 418 on the receive side, thereby improving system efficiency for the RF front end 310.

Additionally, the FIG. 7B embodiment employs a different placement of the first and second transmit/receive switches 410 and 412 compared to the embodiment of FIG. 7A. That is, in the implementation of FIG. 7B the first and second transmit/receive switches 410 and 412 are located between the first and second diplexers 416 and 418 and the output node, whereas in the implementation of FIG. 7A, the first and second transmit/receive switches 410 and 412 are located between the diplexer 414 and each of the first and second power amplifiers 402 and 404 and first and second low noise amplifiers 406 and 408.

The configuration of FIG. 7B may be used in a 5G Ultra High-Band (UHB) RF front end 310. For example, the first and second diplexers 416 and 418 can be separated for the transmit and receive paths instead of using a single diplexer for both the transmit and receive paths as shown in FIG. 7A.

Figure 7C:
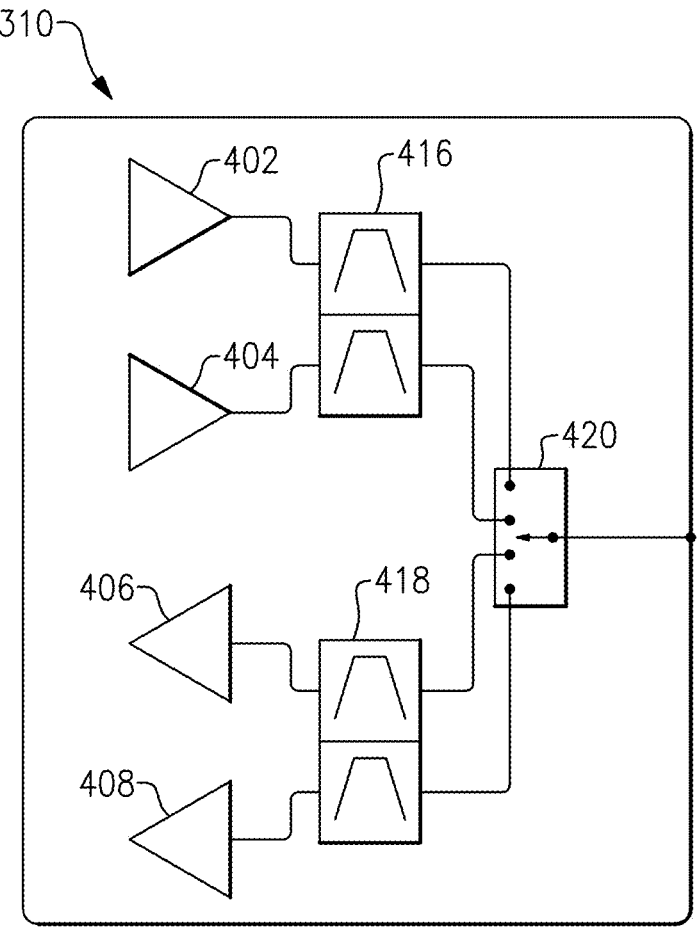
FIG. 7C illustrates yet another example portion of an RF front end for two bands in accordance with aspects of this disclosure.

FIG. 7C illustrates yet another example portion of an RF front end 310 for two bands in accordance with aspects of this disclosure. In this implementation, the RF front end 310 includes a first power amplifier 402, a second power amplifier 404, a first low noise amplifier 406, a second low noise amplifier 408, a first diplexer 416, a second diplexer 418, and a single-pole quadruple-throw (SP4T) switch 420.

The FIG. 7C implementation may be used in situations when concurrent operation of the first and second bands is not required. For example, the SP4T switch 420 can be used in place of the first and second transmit/receive switches 410 and 412 when concurrent operation of the first and second bands is not required. The use of a SP4T switch 420 as shown in FIG. 7C can reduce the insertion loss compared to the FIG. 7B embodiment, and thus, improve the performance for both the receive and transmit modes.

Figure 7D:
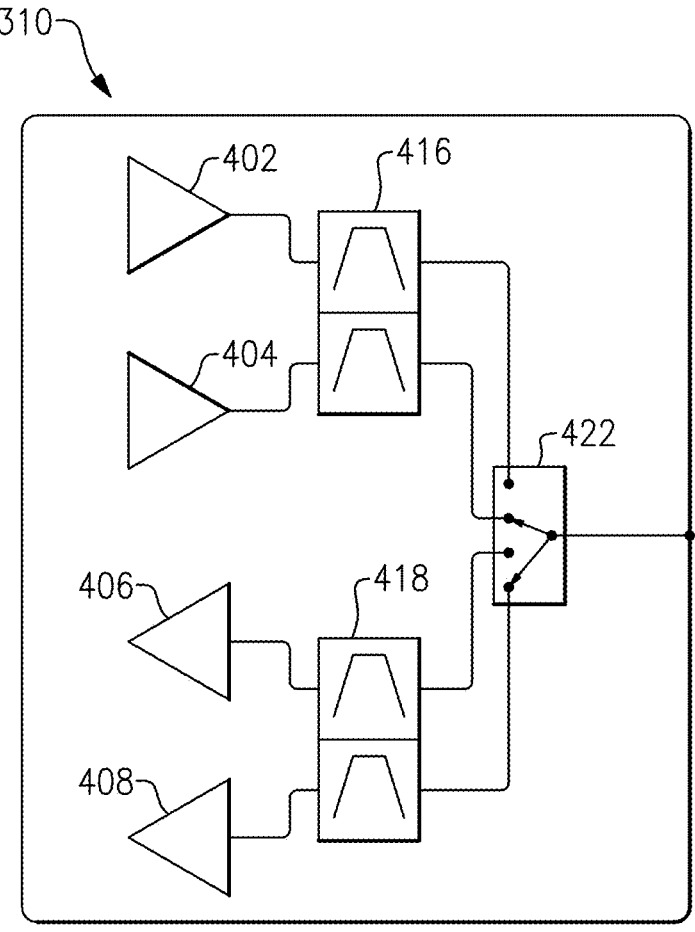
FIG. 7D illustrates still yet another example portion of an RF front end for two bands in accordance with aspects of this disclosure.

FIG. 7D illustrates still yet another example portion of an RF front end 310 for two bands in accordance with aspects of this disclosure. In this implementation, the RF front end 310 includes a first power amplifier 402, a second power amplifier 404, a first low noise amplifier 406, a second low noise amplifier 408, a first diplexer 416, a second diplexer 418, and a double-pole quadruple-throw (2P4T) switch 422.

The FIG. 7D implementation may be used enable asynchronous operation between the first and second bands, for example, by replacing the SP4T switch 420 with the 2P4T switch 422. In this embodiment, band 1 (e.g., n77) could be in TX mode while simultaneously band 2 (e.g., n79) could in the RX mode. Such asynchronous operation is prevalent is many current and future 5G networks.

Figure 8:
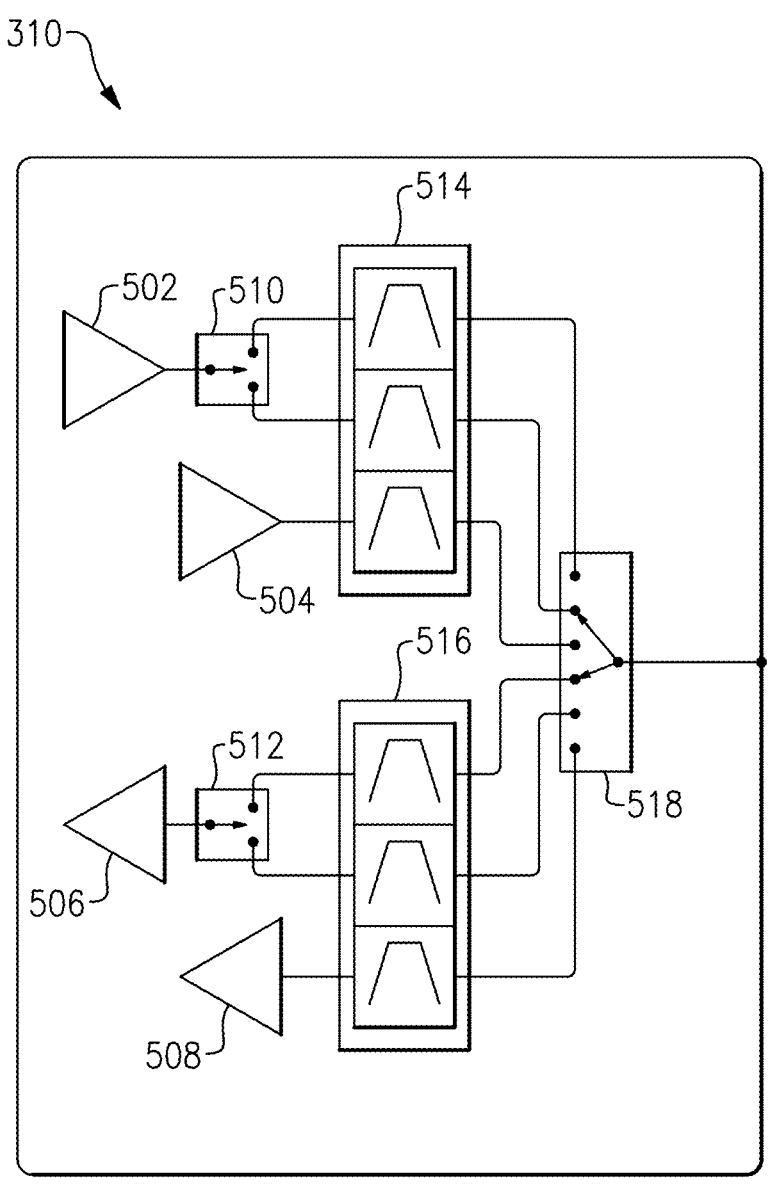
FIG. 8 illustrates an example portion of an RF front end for three bands in accordance with aspects of this disclosure.

FIG. 8 illustrates an example portion of an RF front end 310 for three bands in accordance with aspects of this disclosure. In certain implementations, the RF front end 310 may be configured for transmitting/receiving RF signals for two mid-bands (e.g., band B34 and band B39) and a single high-band (e.g., band n41).

The RF front end 310 of FIG. 8 includes a mid-band power amplifier 502, a high-band power amplifier 504, a mid-band low noise amplifier 506, a high-band low noise amplifier 508, a first SPDT switch 510, a second SPDT switch 512, a first triplexer 514, a second triplexer 516, and a 2P6T switch 518.

For certain combinations of bands, the high-band may not be synchronous with certain mid-bands. For example, the operation of band n41 may not be synchronized with mid-band anchors B34 and B39. However, overlap between receive and transmit period of TDD frames may be possible, and thus, the 2P6T switch 518 includes two poles to allow for this overlap.

To enable asynchronous operation between the mid-bands and the high-band, the first triplexer 514 on the transmit path and the second triplexer 516 on the receive side can be separated. However, the 2P6T switch includes two poles to enable simultaneous receive and transmit operations.

Figure 9A:
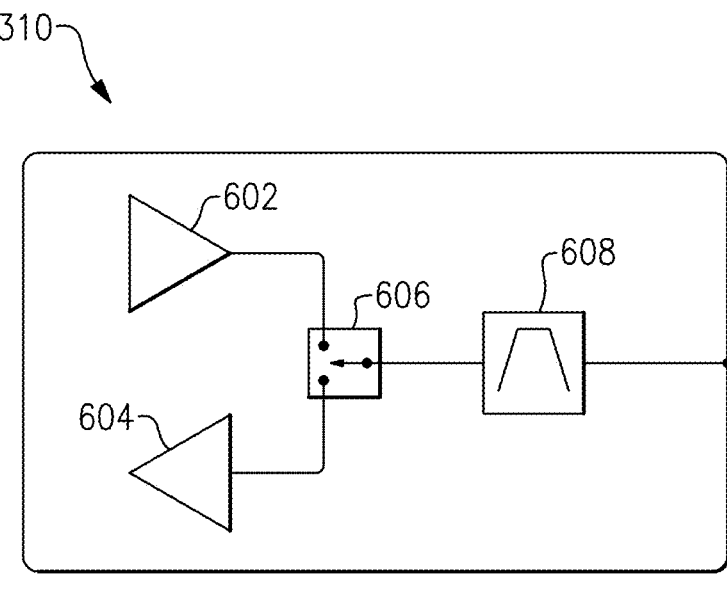
FIG. 9A illustrates an example portion of an RF front end for a single band in accordance with aspects of this disclosure.

FIG. 9A illustrates an example portion of an RF front end 310 for a single band in accordance with aspects of this disclosure. As shown in FIG. 9A, the RF front end 310 includes a power amplifier 602, a low noise amplifier 604, a transmit/receive switch 606, and a pass-band filter 608.

Figure 9B:
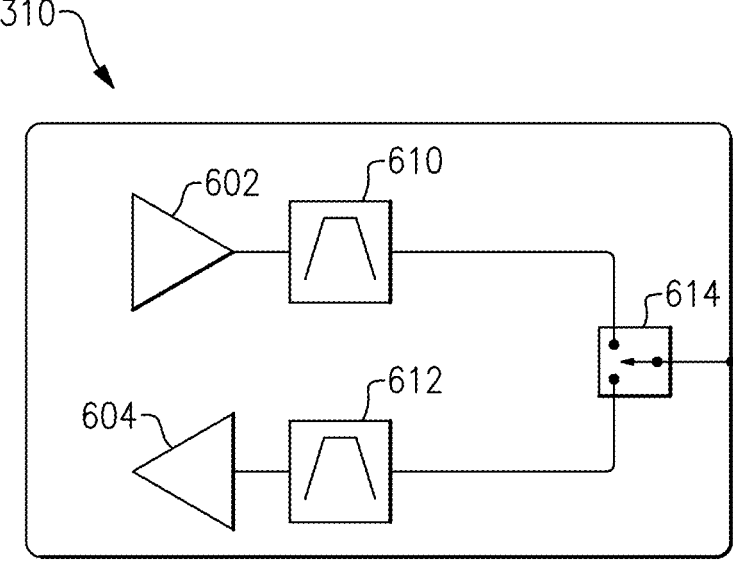
FIG. 9B illustrates another example portion of an RF front end for a single band in which separate filters are provided for the transmit and receive paths in accordance with aspects of this disclosure.

FIG. 9B illustrates another example portion of an RF front end 310 for a single band in which separate filters are provided for the transmit and receive paths in accordance with aspects of this disclosure. As shown in FIG. 9B, the RF front end 310 includes a power amplifier 602, a low noise amplifier 604, a transmit filter 610, a receive filter 612, and a switch 614. In comparison to FIG. 9A, rather than using a single filter 608 for both of the transmit and receive paths, the FIG. 9B implementation separates the filters into the transmit filter 610 and the receive filter 612. This separation of the transmit and receive filters 610 and 612 enables the same improvements (e.g., enhanced block on the receive path and low insertion loss on the transmit path) as those discussed above in connection with FIG. 7B.

In certain embodiments, each band (e.g., all TDD LTE/ NR bands) for a given RF communication system can be implemented using the layout described in connection with FIG. 9B.

Figure 9C:
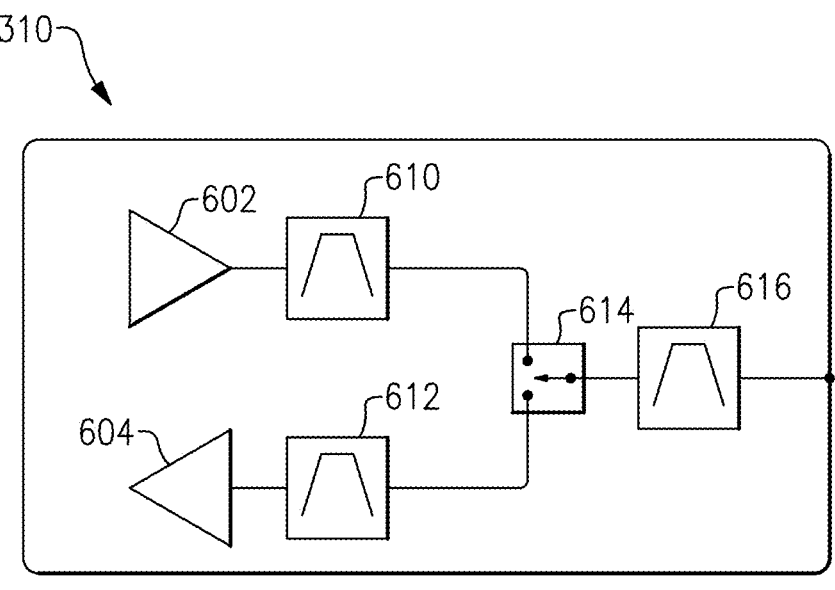
FIG. 9C illustrates an example portion of an RF front end for a single band in accordance with aspects of this disclosure.

However, it may also be possible to reduce the size and cost of the implementation by combining at least part of the receive and transmit filters for certain bands. FIG. 9C illustrates an example portion of an RF front end 310 for a single band in accordance with aspects of this disclosure. As shown in FIG. 9A, the RF front end 310 includes a power amplifier 602, a low noise amplifier 604, a transmit filter 610, a receive filter 612, a switch 614, and a common filter 616. By including the common filter 616 on the shared path between the switch 614 and the output node, the components of the common filter 616 do not need to be duplicated in each of the transmit filter 610 and the receive filter 612, and thus, the overall size of the RF front end 310 can be reduced compared to the FIG. 9B implementation. Further, by having the separate transmit and receive filters 610 and 612, the benefits associated with separate filters can also be achieved in this embodiment.

Figure 10A:
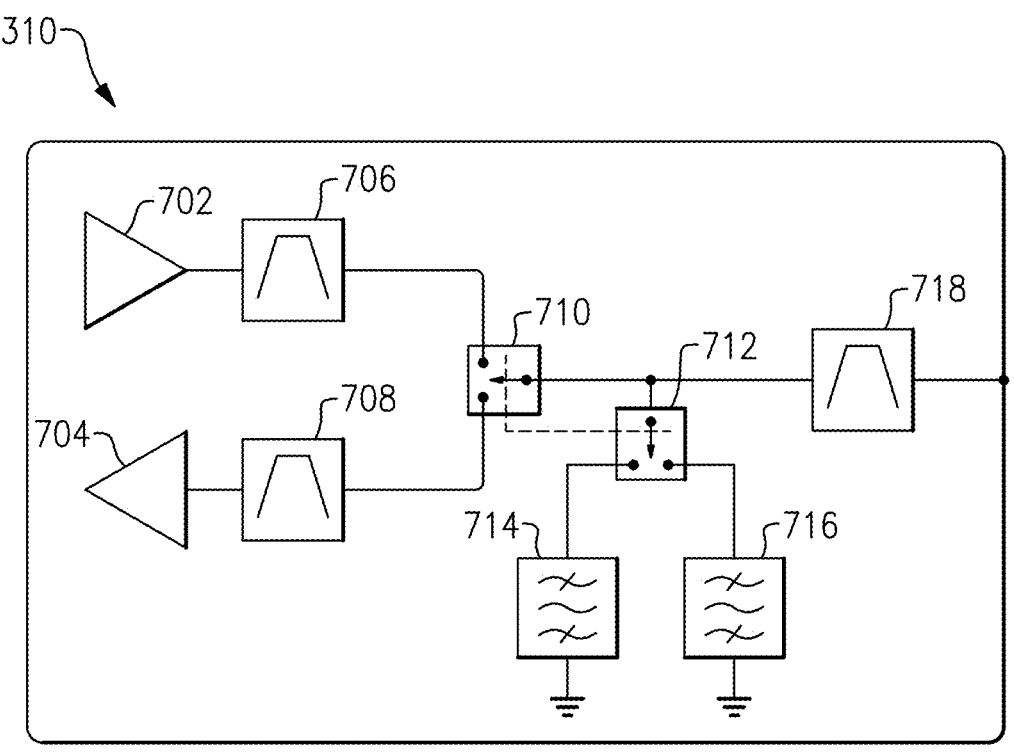
FIG. 10A illustrates an example portion of an RF front end for a single band in accordance with aspects of this disclosure.

FIG. 10A illustrates an example portion of an RF front end 310 for a single band in accordance with aspects of this disclosure. The RF front end 310 illustrated in FIG. 10A includes a power amplifier 702, a low noise amplifier 704, a transmit filter 706, a receive filter 708, a first switch 710, a second switch 712, a first supplemental filter 714, a second supplemental filter 716, and a common filter 718.

The common filter 718 performs a similar function to the common filter 616 of FIG. 9C on the shared path between the first switch 712 and the output node. That is, the components of the common filter 718 do not need to be duplicated in each of the transmit filter 796 and the receive filter 708, and thus, the overall size of the RF front end 310 can be reduced compared to the FIG. 9B implementation.

In the embodiments of FIGS. 9B and 9C, the switch 614 enables the RF front ends 310 to select a dynamic change in signal path filtering (e.g., a selection of either the transmit filter 610 on the transmit path or the receive filter 612 on the receive path). In contrast, in FIG. 10A, the first and second switches 710 and 712 are ganged together in order to dynamically reconfigure the transmit and receive filters in more complex manners by switching in one of the first and second supplemental filters 714 and 716 into the signal path. In the FIG. 10A embodiment, the first and second supplementary filters 714 and 176 may be implemented as shunt filters to ground in order to reject certain portions of the RF spectrum. The first and second supplementary filters 714 and 716 are switched in to form part of the transmit and receive paths and may be entirely different from the transmit and receive filters 706 and 708 not only in center frequency but also in frequency response.

Figure 10B:
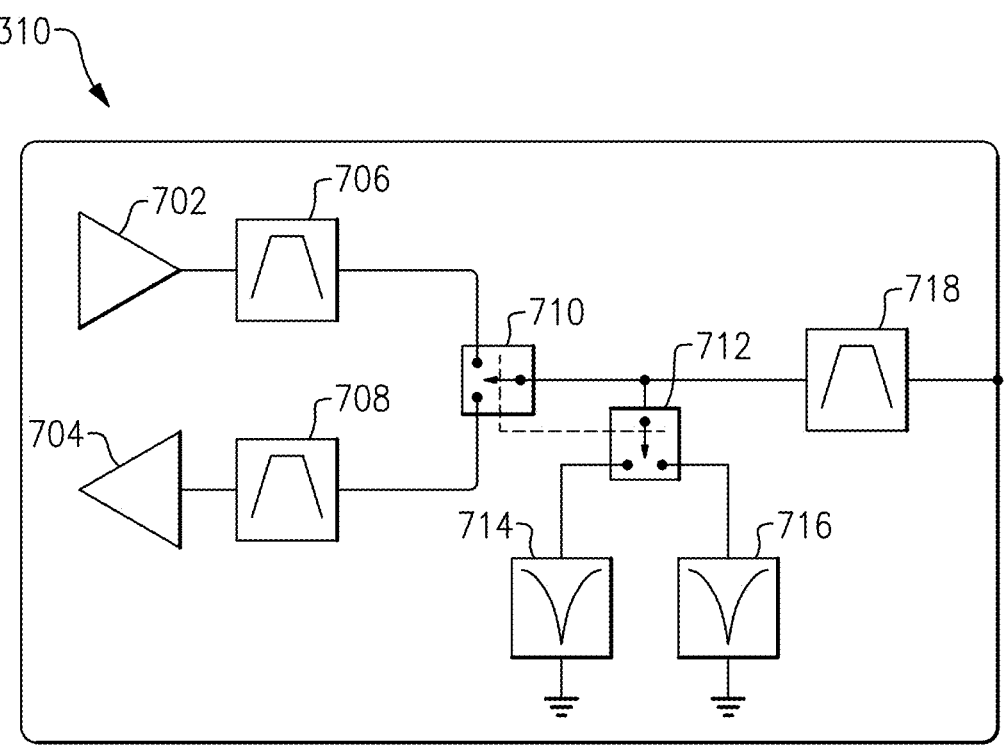
FIG. 10B illustrates another example portion of an RF front end for a single band in accordance with aspects of this disclosure.

FIG. 10B illustrates another example portion of an RF front end 310 for a single band in accordance with aspects of this disclosure. The RF front end 310 illustrated in FIG. 10B includes a power amplifier 702, a low noise amplifier 704, a transmit filter 706, a receive filter 708, a first switch 710, a second switch 712, a first supplemental filter 714, a second supplemental filter 716, and a common filter 718.

In the FIG. 10B embodiment, the first and second supplemental filters 714 and 716 are switched in to form part of the transmit and receive paths and may be implemented as shunt notch filters.

When the FIG. 10B RF front end 310 is implemented for band B41, the first supplemental filter 714 may be switched into the transmit path for the transmit period and may have a notch at the frequency of WiFi 2.4 GHz communication frequency ensures that B41 emission into the WiFi is reduced below a threshold level to ensure that the B41 band transmitter does not interfere with coexisting WiFi radio. Continuing with the band B41 implementation, the second supplemental filter 716 may be switched into the receive path during the receive period and may have a notch at a frequency of the B39 band to ensure that the B39 transmitter is attenuated sufficiently to prevent saturation or IMD generation in the B41 low noise amplifier 704.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A radio frequency front end system comprising:
a first transmit amplifier and a first receive amplifier;
a first switch configured to selectively couple an output node to the first transmit amplifier or to the first receive amplifier;
a first transmit filter coupled between the first transmit amplifier and the first switch, and a first receive filter coupled between the first receive amplifier and the first switch;
a common filter coupled between the first switch and the output node, the common filter together with the first transmit filter configured to band-pass a first radio frequency range and together with the first receive filter configured to band-pass a second radio frequency range different than the first radio frequency range; and
a second transmit amplifier, a second receive amplifier, a second transmit filter, a second receive filter, a first multiplexer, and a second multiplexer, the first multiplexer including the first transmit filter and the second transmit filter, and the second multiplexer including the first receive filter and the second receive filter.

2. The radio frequency front end system of claim 1 wherein the first switch is further configured to selectively couple one of the first multiplexer and the second multiplexer to the output node.

3. The radio frequency front end system of claim 1 further comprising a transmit supplemental filter, a receive supplemental filter, and a second switch ganged together with the first switch, and the second switch configured to selectively couple the transmit supplemental filter to the first transmit amplifier during a transmit period and to couple the receive supplemental filter to the first receive amplifier during a receive period.

4. The radio frequency front end system of claim 3 wherein the transmit supplemental filter includes a shunt filter and the receive supplemental filter includes a shunt filter.

5. The radio frequency front end system of claim 3 wherein the transmit supplemental filter and the receive supplemental filter include notch filters.

6. A radio frequency front end system comprising:
a first transmit amplifier and a first receive amplifier;
a first switch configured to selectively couple an output node to the first transmit amplifier or to the first receive amplifier;
a first transmit filter coupled between the first transmit amplifier and the first switch, and a first receive filter coupled between the first receive amplifier and the first switch;
a common filter coupled between the first switch and the output node, the common filter together with the first transmit filter configured to band-pass a first radio frequency range and together with the first receive filter configured to band-pass a second radio frequency range different than the first radio frequency range; and
a second transmit amplifier, a second receive amplifier, a first filter bank including the first transmit filter and a second transmit filter, and a second filter bank including the first receive filter and a second receive filter.

7. The radio frequency front end system of claim 6 wherein the first switch is further configured to selectively couple one of the first transmit filter and the second transmit filter and one of the first receive filter and the second receive filter to the output node simultaneously.

8. The radio frequency front end system of claim 6 further comprising a transmit supplemental filter, a receive supplemental filter, and a second switch ganged together with the first switch, and the second switch configured to selectively couple the transmit supplemental filter to the first transmit amplifier during a transmit period and to couple the receive supplemental filter to the first receive amplifier during a receive period.

9. A radio frequency front end system comprising:

a first transmit amplifier and a first receive amplifier;

a first switch configured to selectively couple an output node to the first transmit amplifier or to the first receive amplifier;

a first transmit filter coupled between the first transmit amplifier and the first switch, and a first receive filter coupled between the first receive amplifier and the first switch;

a common filter coupled between the first switch and the output node, the common filter together with the first transmit filter configured to band-pass a first radio frequency range and together with the first receive filter configured to band-pass a second radio frequency range different than the first radio frequency range; and a second transmit amplifier, a second receive amplifier, and a second switch, the first transmit filter including a transmit diplexer, the first receive filter including a receive diplexer, the second switch configured to selectively couple the output node to the second transmit amplifier or to the second receive amplifier.

10. The radio frequency front end system of claim 9 further comprising a transmit supplemental filter, a receive supplemental filter, and a second switch ganged together with the first switch, and the second switch configured to selectively couple the transmit supplemental filter to the first transmit amplifier during a transmit period and to couple the receive supplemental filter to the first receive amplifier during a receive period.

11. The radio frequency front end system of claim 10 wherein the transmit supplemental filter includes a shunt filter and the receive supplemental filter includes a shunt filter.

12. The radio frequency front end system of claim 10 wherein the transmit supplemental filter and the receive supplemental filter include notch filters.

13. A mobile device comprising:

an antenna;

a front end system coupled to the antenna and including a first transmit amplifier, a first receive amplifier, a first switch configured to selectively couple an output node to the first transmit amplifier or to the first receive amplifier, a first transmit filter coupled between the first transmit amplifier and the first switch, a first receive filter coupled between the first receive amplifier and the first switch, and a common filter coupled between the first switch and the output node, the common filter together with the first transmit filter configured to band-pass a first radio frequency range and together with the first receive filter configured to band-pass a second radio frequency range different than the first radio frequency range; and a transmit supplemental filter, a receive supplemental filter, and a second switch ganged together with the first switch, and the second switch configured to selectively couple the transmit supplemental filter to the first transmit amplifier during a transmit period and to couple the receive supplemental filter to the first receive amplifier during a receive period.

14. The mobile device of claim 13 wherein the front end system further includes a second transmit amplifier, a second receive amplifier, a second transmit filter, a second receive filter, a first multiplexer including the first transmit filter and the second transmit filter, and a second multiplexer including the first receive filter and the second receive filter.

15. The mobile device of claim 14 wherein the first switch is further configured to selectively couple one of the first multiplexer and the second multiplexer to the output node.

16. The mobile device of claim 13 further comprising a second transmit amplifier, a second receive amplifier, a first filter bank including the first transmit filter and a second transmit filter, and a second filter bank including the first receive filter and a second receive filter.

17. The mobile device of claim 16 wherein the first switch is further configured to selectively couple one of the first transmit filter and the second transmit filter and one of the first receive filter and the second receive filter to the output node simultaneously.

18. The mobile device of claim 13 further comprising a second transmit amplifier, a second receive amplifier, and a second switch, the first transmit filter including a transmit diplexer, the first receive filter including a receive diplexer, the second switch configured to selectively couple the output node to the second transmit amplifier or to the second receive amplifier.

19. The mobile device of claim 13 wherein the transmit supplemental filter and the receive supplemental filter include shunt filters.

20. The mobile device of claim 13 wherein the transmit supplemental filter and the receive supplemental filter include notch filters.

\* \* \* \* \*